(12) United States Patent
Scherzinger et al.

(10) Patent No.: US 8,844,130 B2
(45) Date of Patent: Sep. 30, 2014

(54) ASSEMBLED CAMSHAFT, MAIN CAMSHAFT BODY AND METHOD FOR PRODUCING AN ASSEMBLED CAMSHAFT

(75) Inventors: Guido Scherzinger, Sax (CH); Manfred Muster, Ludesch (AT)

(73) Assignee: ThyssenKrupp Presta TecCenter AG, Eschen (LI)

( * ) Notice: Subject to any disclaimer, the term of this patent is extended or adjusted under 35 U.S.C. 154(b) by 64 days.

(21) Appl. No.: 13/514,657

(22) PCT Filed: Nov. 11, 2010

(86) PCT No.: PCT/EP2010/006884
§ 371 (c)(1),
(2), (4) Date: Jul. 16, 2012

(87) PCT Pub. No.: WO2011/069591
PCT Pub. Date: Jun. 16, 2011

(65) Prior Publication Data
US 2012/0279467 A1   Nov. 8, 2012

(30) Foreign Application Priority Data

Dec. 9, 2009   (DE) .................. 10 2009 057 633

(51) Int. Cl.
| | |
|---|---|
| *B21D 53/84* | (2006.01) |
| *F01L 1/34* | (2006.01) |
| *F01L 1/04* | (2006.01) |
| *F16H 53/02* | (2006.01) |
| *B23P 11/00* | (2006.01) |
| *F01L 13/00* | (2006.01) |
| *F01L 1/047* | (2006.01) |

(52) U.S. Cl.
CPC ............. *B23P 11/00* (2013.01); *F16H 53/025* (2013.01); *F01L 2103/00* (2013.01); *F01L 2013/0052* (2013.01); *F01L 2001/0475* (2013.01); *F01L 13/0036* (2013.01); *B23P 2700/02* (2013.01)
USPC ........................ 29/888.1; 123/90.6; 123/90.16

(58) Field of Classification Search
USPC ................... 123/90.16, 90.6; 29/888.1; 74/567
See application file for complete search history.

(56) References Cited

U.S. PATENT DOCUMENTS 4,882,825 A * 11/1989 Nakamura .................... 29/888.1
4,947,547 A      8/1990 Matt
(Continued)

FOREIGN PATENT DOCUMENTS

DE         37 17 190 A1    12/1988
DE         42 01 473 A1    8/1992
(Continued)

OTHER PUBLICATIONS

International Search Report with English translation dated Mar. 4, 2011 (six (6) pages).

*Primary Examiner* — Thomas Denion
*Assistant Examiner* — Steven D Shipe
(74) *Attorney, Agent, or Firm* — Crowell & Moring LLP

(57) ABSTRACT

A camshaft that is assembled or is to be assembled carries at least one cam element that is to be disposed on a main camshaft body to be rotationally fixed and axially movable, and at least one cam element to be disposed on the main camshaft body so as to be rotationally fixed and axially immovable. The main camshaft body has first axial sub-sections having a multi-tooth profile, so that due to a positive connection between shaft and hub the cam element to be disposed in the sub-section so as to be axially movable is seated so as to be rotationally fixed. The main camshaft body also has second axial sub-sections having an extended diameter so that by a non-positive connection between shaft and hub it is ensured that the cam element to be disposed in the sub-section is seated so as to be rotationally fixed and secured against movement.

14 Claims, 3 Drawing Sheets

(56) References Cited

U.S. PATENT DOCUMENTS

Figure 2:
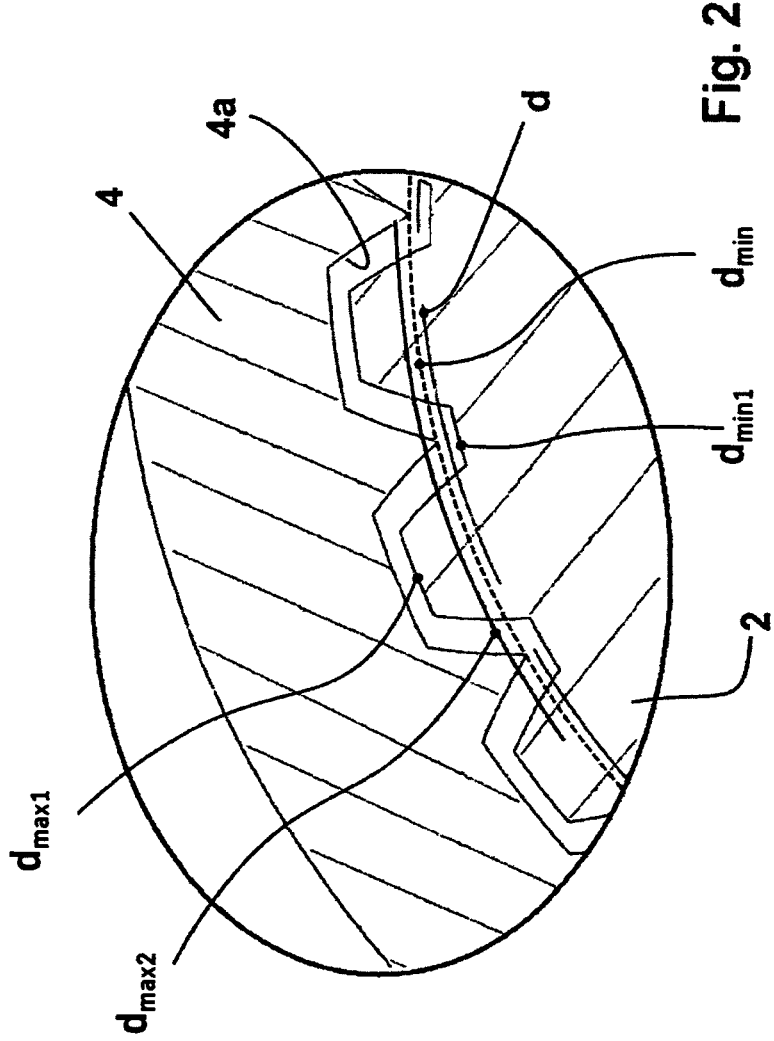

| | | | |
|---|---|---|---|
| 5,158,049 A | 10/1992 | Neumann | |
| 5,307,708 A | 5/1994 | Matt | |
| 7,305,953 B2* | 12/2007 | Walz | 123/90.6 |
| 8,418,667 B2* | 4/2013 | Nendel | 123/90.6 |
| 2005/0011480 A1 | 1/2005 | Schultz et al. | |
| 2006/0064872 A1* | 3/2006 | Shirai | 29/888.1 |
| 2010/0162976 A1* | 7/2010 | Schuler et al. | 123/90.1 |
| 2012/0017721 A1* | 1/2012 | Schmidt | 74/567 |

FOREIGN PATENT DOCUMENTS

| | | |
|---|---|---|
| DE | 41 21 951 C1 | 12/1992 |
| DE | 10 2004 002 301 A1 | 8/2005 |
| EP | 1 503 048 A1 | 2/2005 |
| EP | 2 068 021 A2 | 6/2009 |
| GB | 2 290 599 A | 1/1996 |
| WO | WO 2004/079163 A1 | 9/2004 |
| WO | WO 2010/048973 A1 | 5/2010 |
| WO | WO 2010/108636 A1 | 9/2010 |

* cited by examiner

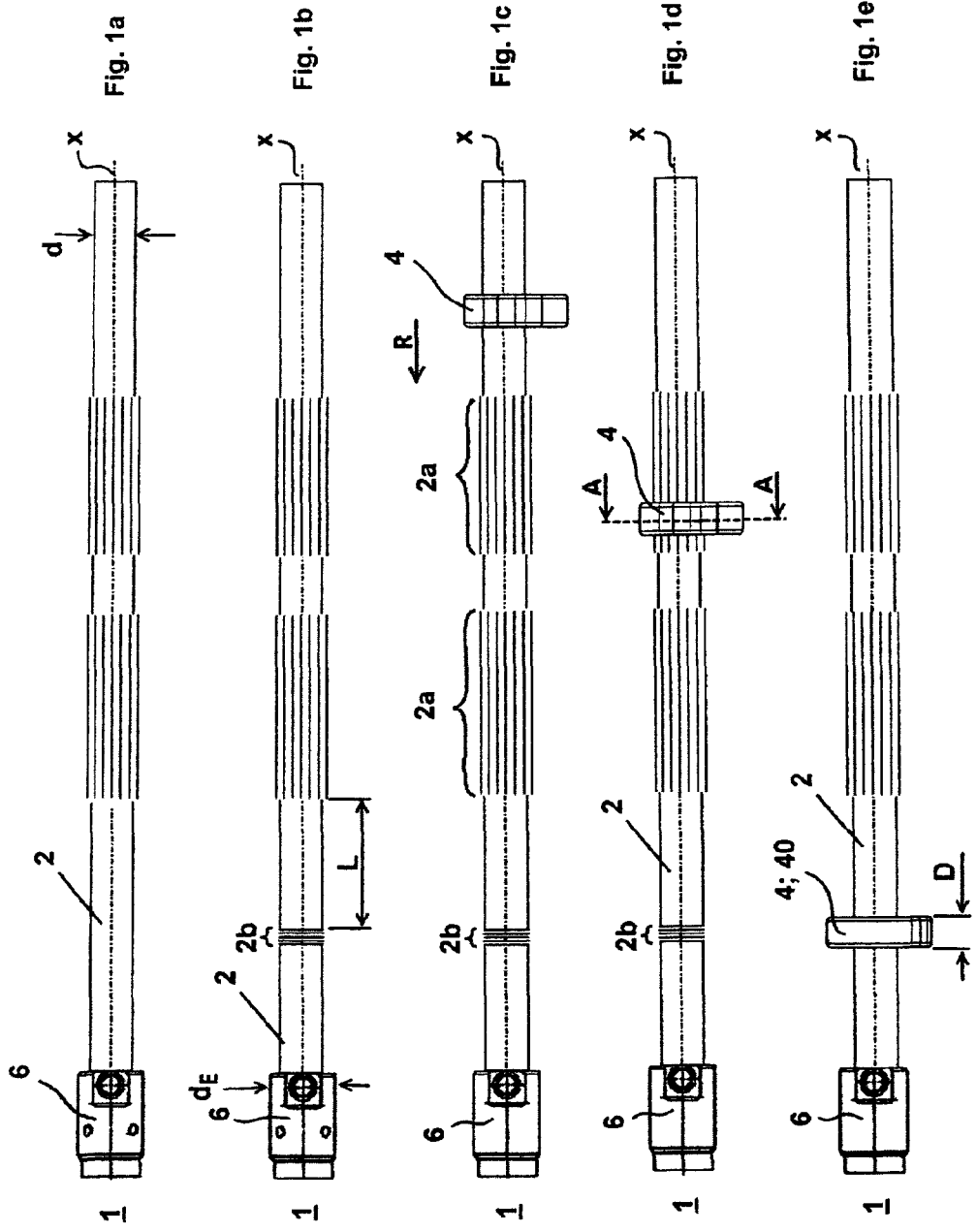

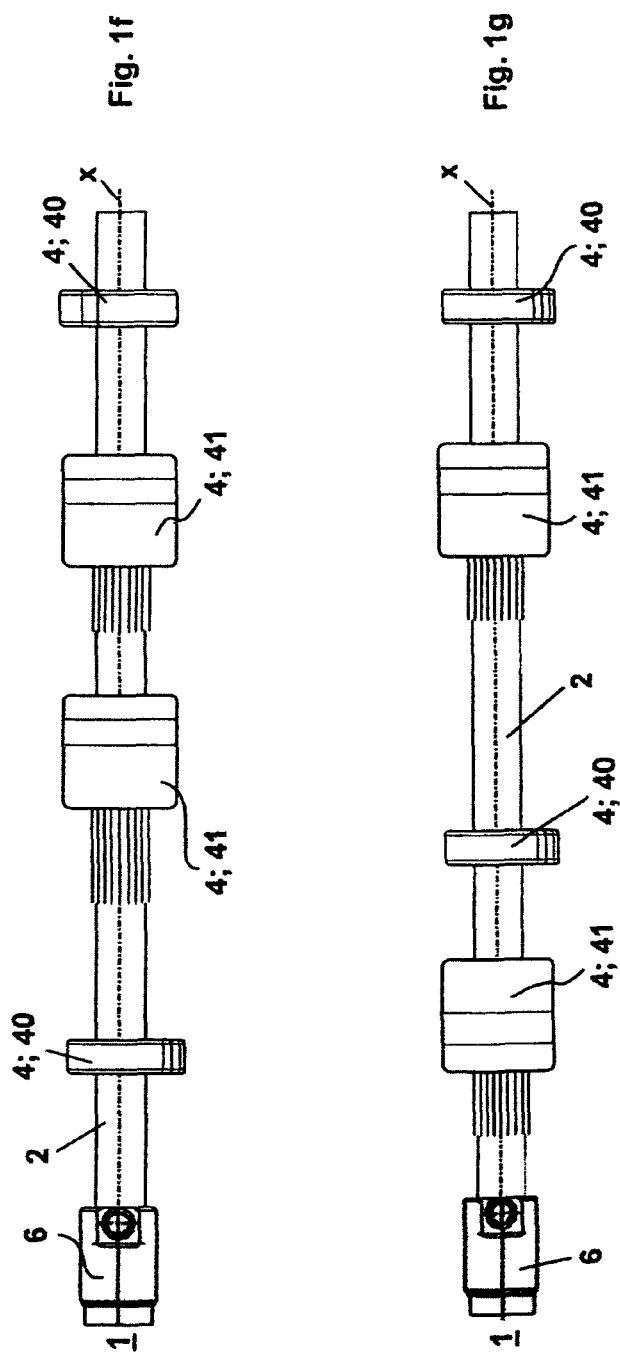

ASSEMBLED CAMSHAFT, MAIN CAMSHAFT BODY AND METHOD FOR PRODUCING AN ASSEMBLED CAMSHAFT

BACKGROUND AND SUMMARY OF THE INVENTION

Exemplary embodiments of the present invention relate to a method and to a main camshaft body for producing a built-up camshaft, and to a built-up camshaft as such, wherein the camshaft that is to be built up or is built up has at least one cam element disposed in a rotationally fixed and axially displaceable manner on a main camshaft body, and at least one cam element disposed in a rotationally fixed and axially non-displaceable manner on the main camshaft body.

In order to be able to operate internal combustion engines in an optimum operating range, the valve train is influenced at regular intervals. For example, it is typical to change the opening times and/or the corresponding valve strokes by means of switchable cams or cam elements formed with various contours. European Patent Document EP 1 503 048 A1 discloses this type of switchable cam or this type of switchable cam element (also designated as a sliding cam). The axially displaceable cam element comprises a tubular sleeve mounted in a rotationally fixed and axially displaceable manner on a camshaft. The axial displacement of the cam element brings a corresponding cam follower into engagement with the various cam curves. In the case of this type of camshaft, not all of the cams or cam elements (or functional elements) routinely have to be disposed in an axially displaceable manner thereon. If a multi-tooth profile is introduced on the common camshaft, the fixed and movable functional elements are secured against rotation on the camshaft by means of the multi-tooth profile.

German Patent Document DE 41 21 951 C1 discloses a camshaft for controlling valves in internal combustion engines, wherein a cam element having a hub, which is enlarged outwardly in the manner of a funnel, is applied in a non-positive manner to a region of a main camshaft body which is roller-burnished and thus enlarged in terms of its outer diameter. One development of this connection is described in PCT International Patent Application Publication No. WO 2004/079163 A1.

In this case, the hub of the cam element has severally inwardly directed extensions, by means of which the cam, which is applied to the roller-burnished region of the main camshaft body, ensures a positive connection in the rotational direction in addition to the non-positive connection in the region of the roller-burnished portion. With regard to this type of non-positive or non-positive/positive attachment, the development of the attachment of axially non-displaceable cam elements on a main camshaft body—as described in German Patent Document DE 41 21 951 C1 and PCT International Patent Application Publication No. WO 2004/079163 A1—is incorporated in its entirety into the disclosure content of the present application.

Furthermore, German Patent Document DE 10 2004 002 301 A1 describes a method of producing a built-up camshaft that likewise produces a built-up camshaft with axially displaceable cam parts. In this case, the displaceable cam elements are constructed in a similar manner and are disposed on the main camshaft body, as has already been described above with reference to European Patent Document EP 1 503 048 A1.

Exemplary embodiments of the present invention are directed to a built-up camshaft and a method and a main camshaft body for producing a built-up camshaft, wherein the camshaft which is built up or is to be built up has cam elements disposed in an axially displaceable and rotationally fixed manner on a main camshaft body (also designated as "switchable cam elements"), and also cam elements disposed in an axially non-displaceable and rotationally fixed manner on a main camshaft body (also designated hereinafter as "fixed cam elements"). During production of a built-up camshaft, superfluous introduction of heat into the components and unnecessary material attenuation are to be omitted where possible. It should also be ensured that in particular the fixed cam elements can be produced in the simplest manner possible and can be aligned in the most precise manner possible in terms of their angular orientation.

In accordance with the inventive method of producing a built-up camshaft both with fixed cam elements and switchable cam elements, a bar-shaped main camshaft body (which is formed in particular as a hollow shaft body) is provided. In an advantageous manner, the main camshaft body has at one end thereof a camshaft end piece formed either as a one-piece component of the main camshaft body or which is connected as a separate component to the main camshaft body in a separate subsequent method step.

In accordance with the invention, the surface of the main camshaft body is machined in such a manner that in at least one first axial sub-section of its surface—e.g., by the introduction, in sections, of a multi-tooth profile (in particular by milling of individual toothed grooves into the main camshaft body surface)—it permits a rotationally fixed and axially displaceable arrangement of cam elements.

Furthermore, the surface of the main camshaft body is machined in such a manner that in at least a second axial sub-section it has a surface region, in which its diameter is enlarged with respect to the first axial sub-section (at least with respect to the minimum diameter of the multi-tooth profile of the first sub-section) as well as with respect to main body sub-sections that are free (i.e., do not have a surface profile formed for an arrangement of cam elements), so that in the enlarged region cam elements can be disposed in a rotationally fixed and non-displaceable manner on the main camshaft body (which optionally have been slid beforehand onto the main camshaft body from a defined thread-on or slide-on direction, with their profile teeth engaging into the profile toothing of the main camshaft body, over one or several multi-tooth region(s) of a first axial sub-section of the main camshaft body). With regard to the non-positive/positive connection to be created between the cam element and the main camshaft body, the content of German Patent Application DE 7 17 190 A1 and PCT International Patent Application Publication No. WO 2004/079163 A1 are also incorporated at this juncture into the disclosure content of this application. In accordance with the types of connection for a non-positive/positive connection of a cam element and main camshaft body, as described in the quoted Prior Art, a main camshaft body is enlarged at a predetermined axial attachment position, so that a cam element which in its axial recess (hub) has radially inwardly directed protrusions (manufactured advantageously by mechanical stripping of the recess) digs with its protrusions in a metal-cutting manner in the region of the enlargement when the cam element is slid onto the main camshaft body, and a non-positive/positive connection is established with the main camshaft body. In a further development of this non-positive/positive connection, a hardenable material (in the form of a filler or the like) is introduced into the intermediate spaces of the structured surface of the main camshaft body which are produced by means of mechanical roller-burnishing, in order to increase the strength of the connection between the cam element and the main camshaft body, In so doing, the maximum shaft body diameter inside the at least one second axial sub-section is larger in dimension than the minimum inner diameter of a cam element which is to be slid on and is to be positioned in the second sub-section (and of which regions are reduced in size by the radially inwardly directed tooth protrusions). This ensures that when the cam elements are mounted on the main camshaft body, during which the cam elements are (or can be) drawn exclusively from one direction (predetermined thread-on direction) onto the main camshaft body and during which the cam elements are substantially similar (optionally also identical) in design with regard to their hub (or their hub cross-section), the cam elements can be mounted in a simple manner. On the other hand, it is ensured that the cam elements that are fixed or are to be fixedly mounted can be slid over a multi-tooth section, which as seen in the thread-on direction is located upstream, in order (subsequently) to be able to be connected in a non-positive/positive manner to the main camshaft body in a region having an enlarged diameter located axially downstream.

In an advantageous manner, the cam elements that are to be disposed as axially non-displaceable elements on the main camshaft body can be manufactured, with regard to their hub cross-section, with considerably more clearance (increased dimensional tolerance along the lines of a so-called "clearance fit") in comparison with the cam elements which are to be mounted in an axially displaceable manner on the main camshaft body. On the one hand, this reduces manufacturing costs and on the other hand effectively prevents these can elements from damaging the surface of a multi-tooth region when they are slid over it. The earn elements that are fixed (or are to be mounted in a non-positive/positive manner) and also the cam elements that are to be mounted in an axially displaceable manner (or are switchable) can be slid over the (multi-tooth) profile of a first sub-section of the main camshaft body. In an advantageous manner, with regard to their hub cross-section the fixed cam elements can have (optionally considerably) fewer profile teeth in comparison with the switchable cam elements, so that by reason of the increased dimensional clearance and/or the reduced number of teeth, more cost-effective production and simplified assembly (simplified sliding over the (multi-tooth) profile of a/the first axial sub-section) of the cam elements to be attached in a non-positive/positive manner are achieved.

In a particularly preferred embodiment of the method in accordance with the invention, the first and second axial sub-sections—as seen in the thread-on direction of the cam elements—are spaced apart from one another to a defined extent (end of the first sub-section to the beginning of the second sub-section), which is greater than the thickness of a cam element that is to be disposed in a rotationally fixed and axially non-displaceable manner. As a consequence, an angularly oriented alignment of the cam element that is to be drawn on only has to be performed immediately prior to pressing the cam element onto the second axial sub-section which is enlarged in terms of its diameter.

In accordance with a first embodiment of the method in accordance with the invention, the production of a built-up camshaft having at least one first axial sub-section and having at least one second axial sub-section is described, wherein as seen in a predetermined thread-on direction the second axial sub-section is located with a radial enlargement of the shaft body diameter downstream of the first axial sub-section which advantageously is formed peripherally with a multi-tooth profile extending in the axial direction. In this embodiment, the machining of the main camshaft body, with regard to the first and second axial sub-section(s) to be formed, can be performed jointly—the sequence in which the surface-machining of the two different axial sub-sections (first and second sub-section) is performed is arbitrary in this case. Then, during assembly of the cam elements on the main camshaft body, a cam element is first to be slid over at least one upstream first axial sub-section as far as against the second axial sub-section enlarged in diameter, and is to be attached in a non-positive/positive manner to the main camshaft body by means of relative displacement between the cam element and the main camshaft body. A switchable cam element is then mounted onto the first sub-section located upstream in the thread-on direction.

In accordance with a second embodiment of the method in accordance with the invention, in which as seen in the thread-on direction, starting from the free thread-on end of the main camshaft body, a second axial sub-section with a radial enlargement of the shaft body diameter is located upstream of a first axial sub-section, the sequence in which the surface-machining of the main camshaft body is performed is not arbitrary. In order not to prevent cam elements from being threaded on by reason of the shaft body diameter being enlarged at an upstream position, wherein said cam elements are to be mounted in a displaceable manner in a first axial sub-section that as seen in the thread-on direction is located downstream, the surface-machining of the at least one first axial sub-section is performed in a first machining step, the cam element that is to be disposed in a displaceable manner is then slid on with angular orientation and is positioned in the first sub-section in a rotationally fixed and axially displaceable manner, in order then to perform the surface-machining of the upstream second axial sub-section in a second surface-machining step, and the cam element which in this case is to be mounted in a rotationally fixed and axially non-displaceable manner is to be disposed on the camshaft body with angular orientation in non-positive/positive manner (by pressing). Depending upon the number and desired arrangement of fixed and switchable cam elements, the method steps of the two above-described embodiments of the method in accordance with the invention can be combined accordingly.

The main camshaft body, configured in accordance with the invention, for producing a built-up camshaft, in which once again individual cam elements are slid in a predetermined thread-on direction onto the main camshaft body, as well as the built-up camshaft itself, have in accordance with the inventive method first axial sub-sections, in which the main camshaft body surface is contoured such that a positive shaft-hub connection serves to guarantee a rotationally fixed seating of the cam element to be disposed in this sub-section in an axially displaceable manner. Furthermore, the main camshaft body comprises at least one second sub-section (in particular a sub-section that is disposed in a predetermined thread-on direction downstream of the first sub-section) with an enlarged maximum shaft body diameter, in which the main camshaft body surface is contoured such that a non-positive/positive shaft-hub connection serves to guarantee a rotationally fixed and non-displaceable seating of the cam element to be disposed in this sub-section. In a preferred manner, as seen in the thread-on direction of the cam elements, a first and a second sub-section are axially spaced apart from one another by a distance that is larger in dimension than the thickness of a cam element which is to be disposed in a second sub-section in a non-positive/positive manner on the main camshaft body.

BRIEF DESCRIPTION OF THE DRAWING FIGURES

The invention will be explained in greater detail hereinafter with reference to exemplified embodiments illustrated in the drawing, in which:

FIGS. 1a-1e show various stages of a first embodiment of method in accordance with the invention for producing a built-up camshaft, using the example of a cam element that is to be disposed in a non-positive/positive manner on a main camshaft body—in a roller—burnished region, which as seen in the thread-on direction, is located downstream of a first multi-tooth region, FIGS. 1f, 1g show a built-up camshaft in accordance with the invention for a four-cylinder internal combustion engine in two different exemplary embodiments, and FIG. 2 shows a detailed section of a section taken along the sectional line A-A in FIG. 1d of the main camshaft body with a cam element that is slid on in the first sub-section (with multi-tooth profiling).

DETAILED DESCRIPTION

FIGS. 1a-1e illustrate various stages of a first embodiment of the method in accordance with the invention for producing a built-up camshaft 1 for a four-cylinder internal combustion engine.

FIGS. 1a-1g illustrate a main camshaft body 2 having a diameter d (in the sub-sections which, with regard to a functional element attachment, do not comprise a surface-side attachment contour), on one free end of which (left-hand side end) there is disposed a camshaft end piece 6 having an outer diameter $d_e$ larger than the diameter d of the main camshaft body 2. During production of the main camshaft body 2, the camshaft end piece 6 can be formed in one piece thereon or alternatively can be attached in one of the production or machining steps at a predetermined point in time as a separate camshaft end piece 6 to the main camshaft body 2 by means of a weld, solder, shrink, crimped, screw or adhesive connection or the like. In a preferred embodiment, the camshaft end piece 6 is connected to the main camshaft body 2 in a similar manner to the mode of attachment of the cam elements 4; 40 (fixed cam elements 40), which are to be attached in a non-positive/positive manner to the main camshaft body 2. In this regard, reference is made to the description hereinafter.

In accordance with FIG. 1a, in a first production or machining step (method step) the main camshaft body 2 is machined such that inside at least one first axial sub-section 2a the main body surface has a cross-sectional shape or surface-side attachment contour that deviates, at least in peripheral sub-regions, from the circular cross-sectional shape. In accordance with FIG. 2, e.g. a multi-tooth profile is introduced as this type of attachment contour into the main body surface (e.g., by milling-machining of the main body surface). The multi-tooth profile that is illustrated by way of example is produced in an advantageous manner by cutting the surface of the main camshaft body, wherein a bar-shaped blank is reduced in size over its entire length—with the exception of the axial sub-regions (first axial sub-sections 2a), in which the multi-tooth profile is to be introduced—to a main body diameter d (e.g. by rotary machining on a lathe). Subsequently, the illustrated multi-tooth profile (milling-in of toothed grooves) can be introduced into the surface by milling-machining of the first sub-sections 2a. In this case, the toothed grooves can reduce the diameter d of the main camshaft body 2 as illustrated (minimum diameter $d_{min1}$ in the first sub-section 2a<diameter d). However, it is also feasible for the base of the toothed grooves to coincide with the diameter d of the main camshaft body (Minimum diameter $d_{min1}$ in the first sub-section 2a≈diameter d) or it even remains slightly larger in dimension than the main body diameter d (minimum diameter $d_{min1}$ in the first subsection 2a>diameter d). The profile teeth remaining between the toothed grooves increase regions of the main body diameter d to a maximum sub-section diameter $d_{max1}$. In the two illustrated embodiments of an input-side and output-side camshaft for a four-cylinder internal combustion engine, a total of two first, mutually spaced apart, axial sub-sections 2a are produced in the central region of the main camshaft body 2.

In accordance with FIG. 1b, in a second method step—which in this case can also be performed together with the above-described first method step—the main camshaft body 2 is machined between the camshaft end piece 6 and the first axial sub-section 2a—via a second axial sub-section 2b—such that inside the second axial sub-section 2b the main camshaft body 2 is enlarged to an increased maximum diameter $d_{max2}$. This maximum diameter $d_{max2}$ of the second axial sub-section $d_{max2}$ is larger in dimension than the minimum diameter $d_{min1}$ of the first axial sub-section 2a.

In an advantageous manner, the or each first sub-section 2a is produced in such a manner that it comprises a multi-tooth profile that extends in the axial direction, whereas the second axial sub-section 2b is enlarged in particular by roller-burnishing of the main body 2a.

In a third method step, in accordance with FIGS. 1c and 1d a (fixed) cam element 4; 40 to be attached in a non-positive/positive manner in a second axial sub-section 2b located downstream in the thread-on direction (with an intermeshing toothing arrangement of the cam element 4; 40 and main body 2) is slid over the first axial sub-section 2a and is pressed with its toothing arrangement, in a non-positive/positive manner onto the second axial sub-section 2b which is enlarged in diameter (FIG. 1e).

In order to position an additional switchable cam element 4; 41 which can then be disposed in an axially displaceable manner in the first sub-region 2a, which as seen in the thread-on direction R is located upstream, the further cam element 4; 41 is threaded (slid) onto the main camshaft body 2 and is held inside the first sub-section 2a by virtue of locking means, not illustrated, for improved handling during further assembly (e.g., by clipping on assembly locking rings on both sides) or for limiting the axial displacement path during a subsequent operation (e.g., by means of a latching connection, which is disposed between the main camshaft body 2 and hub 4a of the cam element 4; 41 and can be released by axial displacement force, for various operating positions each allocated to a cam track of a cam element 4; 41) (FIG. 1f, 1g).

In the event that several cam elements 4 are to be disposed alternately in an axially displaceable (41) and axially non-displaceable (40) manner on the main camshaft body 2 (FIGS. 1f, 1g) or in the cases where an axial second sub-section 2b (roller-burnished portion) is located upstream of a first axial sub-section 2a (multi-tooth profile) as seen in the thread-on direction R (as illustrated in FIG. 1f, with the roller-burnished portion located externally on the right, or in FIG. 1d with both roller-burnished portions), it is necessary to ensure that the roller-burnishing or enlargement in diameter in the second axial sub-section 2b is effected only after assembly of a or the cam element(s) to be positioned in a first axial sub-section 2a, which as seen in the thread-on direction R is located downstream, because otherwise threading can no longer occur without causing damage to the roller-burnished portion which has been introduced "too early".

Furthermore, the axial distance L as seen in the draw-on direction R between a first sub-section 2a and a roller-burnished portion, which as seen in the thread-on direction R is located downstream (FIGS. 1b-1d), should be larger in dimension than the thickness D of a cam element 40 that is to be attached in a non-positive/positive manner to the roller-burnished portion. This ensures that the cam element 40 that is threaded on beforehand via the main camshaft body 2 also via a first sub-section 2a can be rotated and pre-positioned in any angular position immediately in advance of the second sub-section 2b which is enlarged by roller-burnishing, in order then to be positioned accordingly with angular precision in the second sub-section 2b in a rotationally fixed and non-displaceable manner.

FIG. 2 illustrates a detailed section of a section taken along the sectional line A-A in FIG. 1d. In this case, it is readily apparent that the main camshaft body 2 comprises, in the region of its first axial sub-section 2a, a multi-tooth profile which as seen in cross-section has a double trapezium shape (teeth and also teeth intermediate spaces are trapezoidal in formation). It is also readily apparent that the cam elements 4; 40, 41 or the hubs 4a of the camshaft elements 4; 40, 41 are adapted to the contour of the main camshaft body 2 in the first axial sub-section 2a such that they are mounted in an axially displaceable and at the same time rotationally fixed manner with a small degree of clearance being maintained. As seen in cross-section, the inwardly directed profile teeth of the hub 4a are advantageously triangular in design or have an inwardly directed apex.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A method of producing a built-up camshaft, the method comprising steps of:
    providing a bar-shaped main camshaft body,
    machining the main camshaft body by
        surface-machining the main camshaft body in a first axial sub-section by introducing a multi-tooth outer surface profile that extends in an axial direction,
        surface-machining the main camshaft body in a second axial sub-section, which as seen in a predetermined thread-on direction is located downstream of the first sub-section, by enlarging at least regions of the main camshaft body to an increased outer diameter to form an enlarged region,
    providing a plurality of cam elements, each having a hub cross-section with a multi-tooth inner surface profile that, extends in the axial direction and correlates with the multi-tooth outer surface profile of the first axial sub-section, wherein each hub cross-section has a minimum inner diameter that is smaller in dimension than a maximum diameter of the increased outer diameter in the second sub-section of the main camshaft body,
    assembling the cam elements by
        sliding a first cam element of the plurality of cam elements in the thread-on direction over the first axial sub section as far as against the enlarged region of the second axial sub-section onto the main camshaft body, the slid-on first cam element is oriented with angular precision with a predetermined reference position of the main camshaft body and is connected in a non-positive or positive manner to the main camshaft body by subsequent axial relative movement between the first cam element and main camshaft body that causes the multi-tooth inner surface profile of the first cam element to dig in a metal cutting manner into the enlarged region of the second axial sub-section, the first cam element disposed in a rotationally fixed and axially non-displaceable manner on the main camshaft body,
        subsequently sliding a second cam element of the plurality of cam elements with angular orientation in the thread-on direction as far as into the first sub-section onto the main camshaft body where it is positioned in a rotationally fixed and axially displaceable manner.

2. The method as claimed in claim 1, wherein the inner surface profile of the second cam element is formed with less dimensional clearance with respect to the correlating outer surface profile of the first axial sub-section than the inner surface profile of the first cam element.

3. The method as claimed in claim 2, wherein the inner surface profile of the second cam element has more teeth than the inner surface profile of the first cam element.

4. The method as claimed in claim 1, wherein the surface-machining of the second sub-section is effected by mechanical roller-burnishing.

5. A method of producing a built-up camshaft, the method comprising the steps of:
    providing a bar-shaped main camshaft body,
    machining the main camshaft body by
        surface-machining the main camshaft body in a first axial sub-section, by introducing a multi-toothed outer surface profile that extends in an axial direction,
    providing a first cam element, having a hub cross-section with a multi-tooth inner surface profile that extends in the axial direction and correlates with the multi-tooth outer surface profile of the first axial sub-section for rotationally fixed and axially displaceable positioning,
    assembling the first cam element, wherein the first cam element is positioned in a rotationally fixed and axially displaceable manner on the bar-shaped main camshaft body by being slid with angular orientation in a predetermined thread-on direction onto the main camshaft body in the first axial sub-section,
    surface-machining the main camshaft body in a second axial sub-section, which as seen in the thread-on direction is located upstream of the first axial sub-section, by enlarging a region of the main camshaft body to an increased outer diameter to form an enlarged region,
    providing a second cam element having a hub cross-section with multi-tooth inner surface profile that extends in the axial direction and correlates with the surface profile of the main camshaft body, wherein the hub cross-section of the second cam element has a minimum inner diameter that is smaller in dimension than a maximum diameter of the increased outer diameter in the second sub-section of the main camshaft body, and
    assembling the second cam element, wherein the second cam element is slid in the thread-on direction as far as against the second axial sub-section, which is enlarged in diameter, onto the main camshaft body, it is oriented with angular precision with a predetermined reference position of the main camshaft body and is connected in a non-positive or positive manner to the main camshaft body by subsequent axial relative movement between the second cam element and the main camshaft body that causes the multi-tooth inner surface profile of the second cam element to dig in a metal cutting manner into the enlarged region of the second axial sub-section.

6. The method as claimed in claim 5, wherein the inner surface profile of the second cam element is formed with less dimensional clearance with respect to the correlating outer surface profile of the first axial sub-section than the inner surface profile of the first earn element.

7. The method as claimed in claim 6, wherein the inner surface profile of the second cam element has more teeth than the inner surface profile of the first cam element.

8. The method as claimed in claim 5, wherein the surface-machining of the second sub-section is effected by mechanical roller-burnishing.

9. A main camshaft body for producing a built-up camshaft, wherein the main camshaft body comprises:
   a first axial sub-section having a multi-tooth profile configured to receive at least one cam element that is to be disposed in a rotationally fixed and axially displaceable manner; and
   a second axial sub-section configured to receive a cam element having a multi-tooth inner surface profile and that is to be disposed in a rotationally fixed and axially non-displaceable manner,
   wherein at least regions of the main camshaft body inside the second axial sub-section have a larger diameter than the main camshaft body, the multi-tooth inner surface profile engages in a metal cutting manner into the second axial sub-section, and a maximum diameter in die second sub-section is larger in dimension than a minimum diameter in the first sub-section.

10. The main camshaft body as claimed in claim 9, wherein the main camshaft body comprises in the second axial sub-section a profile produced by roller-burnishing.

11. The main camshaft body as claimed in claim 10, wherein the main camshaft body comprises a camshaft end piece on one of its two free ends.

12. A built-up camshaft, comprising:
   a first cam element disposed in a rotationally fixed and axially non-displaceable manner on a bar-shaped main camshaft body,
   a second cam element disposed in a rotationally fixed and axially displaceable manner on the main camshaft body,
   wherein the main camshaft body comprises
      a first axial sub-section having a multi-tooth profile that extends in the axial direction, and
      a second axial sub-section without any multi-tooth profiling, in which at least regions of the main camshaft body are enlarged to an increased diameter,
   wherein each of the first and second cam elements comprise a hub having an inner multi-tooth profile that correlates with the multi-tooth profile of the first axial sub-section,
   wherein the second cam element is positioned in the first axial sub-section in a rotationally fixed and axially displaceable manner on the main camshaft body,
      wherein the first cam element is positioned in the second sub-section and is connected in a non-positive or positive manner to the main camshaft body,
      wherein a hub cross-section of each of the first and second cam elements has a minimum inner diameter that is smaller than the increased diameter in the second sub-section of the main camshaft body.

13. The built-up camshaft as claimed in claim 12, wherein the inner surface profile of the second cam element has less dimensional clearance with respect to a correlating outer surface profile of the first axial sub-section than the inner surface profile of the first cam element.

14. The built-up camshaft as claimed in claim 12, wherein the inner surface profile of the second cam element has more teeth than the inner surface profile of the first cam element.

* * * * *